(12) United States Patent
Yang et al.

(10) Patent No.: US 7,437,185 B2
(45) Date of Patent: Oct. 14, 2008

(54) FOLDER TYPE MOBILE TERMINAL

(75) Inventors: Ji-Sung Yang, Seoul (KR); Young-Woo Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 8 days.

(21) Appl. No.: 10/975,939

(22) Filed: Oct. 27, 2004

(65) Prior Publication Data
US 2005/0090297 A1   Apr. 28, 2005

(30) Foreign Application Priority Data
Oct. 28, 2003  (KR) ...................... 10-2003-0075628

(51) Int. Cl.
*H04M 1/00* (2006.01)
(52) U.S. Cl. ................ 455/575.3; 455/575.1; 455/90.3; 379/433.13
(58) Field of Classification Search .............. 455/575.3, 455/1, 90.3, 550.1, 575.1, 556.1, 3; 379/433.13; 361/679, 814; 16/303, 335; D14/138; 348/14.02
See application file for complete search history.

(56) References Cited

U.S. PATENT DOCUMENTS

| | | | | |
|---|---|---|---|---|
| 6,069,648 | A * | 5/2000 | Suso et al. ............... | 348/14.02 |
| 6,320,961 | B1 * | 11/2001 | Hayasaka ............... | 379/433.13 |
| 6,484,016 | B1 * | 11/2002 | Cheon ....................... | 455/90.1 |
| 6,697,117 | B1 * | 2/2004 | Park .......................... | 348/373 |
| 6,704,586 | B2 * | 3/2004 | Park .......................... | 455/575.3 |
| 6,879,337 | B2 * | 4/2005 | Tatehana et al. .......... | 348/14.02 |
| 7,006,854 | B2 * | 2/2006 | Choi ......................... | 455/575.3 |
| 7,082,289 | B2 * | 7/2006 | Lim .......................... | 455/90.3 |
| 7,133,691 | B2 * | 11/2006 | Kang ........................ | 455/556.1 |
| 7,190,968 | B2 * | 3/2007 | Nakamura ............... | 455/550.1 |
| 7,218,732 | B2 * | 5/2007 | Tanaka et al. ........... | 379/433.13 |
| 7,373,186 | B2 * | 5/2008 | Watanabe et al. ........ | 455/575.3 |
| 2001/0034242 | A1 * | 10/2001 | Takagi ....................... | 455/550 |
| 2002/0016182 | A1 | 2/2002 | Kubo et al. | |
| 2002/0032010 | A1 | 3/2002 | Okuda et al. | |
| 2002/0168948 | A1 | 11/2002 | Watanabe | |
| 2003/0109232 | A1 * | 6/2003 | Park et al. ....................... | 455/90 |
| 2004/0198433 | A1 * | 10/2004 | Lee .............................. | 455/556.1 |

FOREIGN PATENT DOCUMENTS

| | | |
|---|---|---|
| EP | 1 267 576 A2 | 12/2002 |
| JP | 2002-290523 | 10/2002 |
| JP | 2002-359678 | 12/2002 |
| JP | 2003-060764 | 2/2003 |
| WO | WO 02/090785 A1 | 11/2002 |
| WO | WO 02/104008 A1 | 12/2002 |

* cited by examiner

*Primary Examiner*—Sharad Rampuria
(74) *Attorney, Agent, or Firm*—Lee, Hong, Degerman, Kang & Schmadeka

(57) ABSTRACT

A folder type mobile terminal comprising a main body, a folder rotatably connected to the main body, a hinge connection part formed between the main body and the folder for rotatably connecting the folder to the main body, and a movement preventing part formed at the hinge connection part for preventing movement of the folder from the main body in a horizontal direction.

14 Claims, 7 Drawing Sheets

FOLDER TYPE MOBILE TERMINAL

CROSS-REFERENCE TO RELATED APPLICATIONS

Pursuant to 35 U.S.C. § 119(a), this application claims the benefit of earlier filing date and right of priority to Korean Application No. 10-2003-0075628, filed on Oct. 28, 2003, the contents of which is hereby incorporated by reference herein in its entirety.

BACKGROUND OF THE INVENTION

1. Field of the Invention

The present invention relates to a folder type mobile terminal and, more particularly, to a folder type mobile terminal capable of minimizing movement of a folder in a horizontal (left/right) direction.

2. Description of the Related Art

Recently, mobile terminals have been installed with camera devices enabling users to shoot photographs in addition to general functions such as transmitting and receiving voice signals and accessing the Internet.

Figure 1:
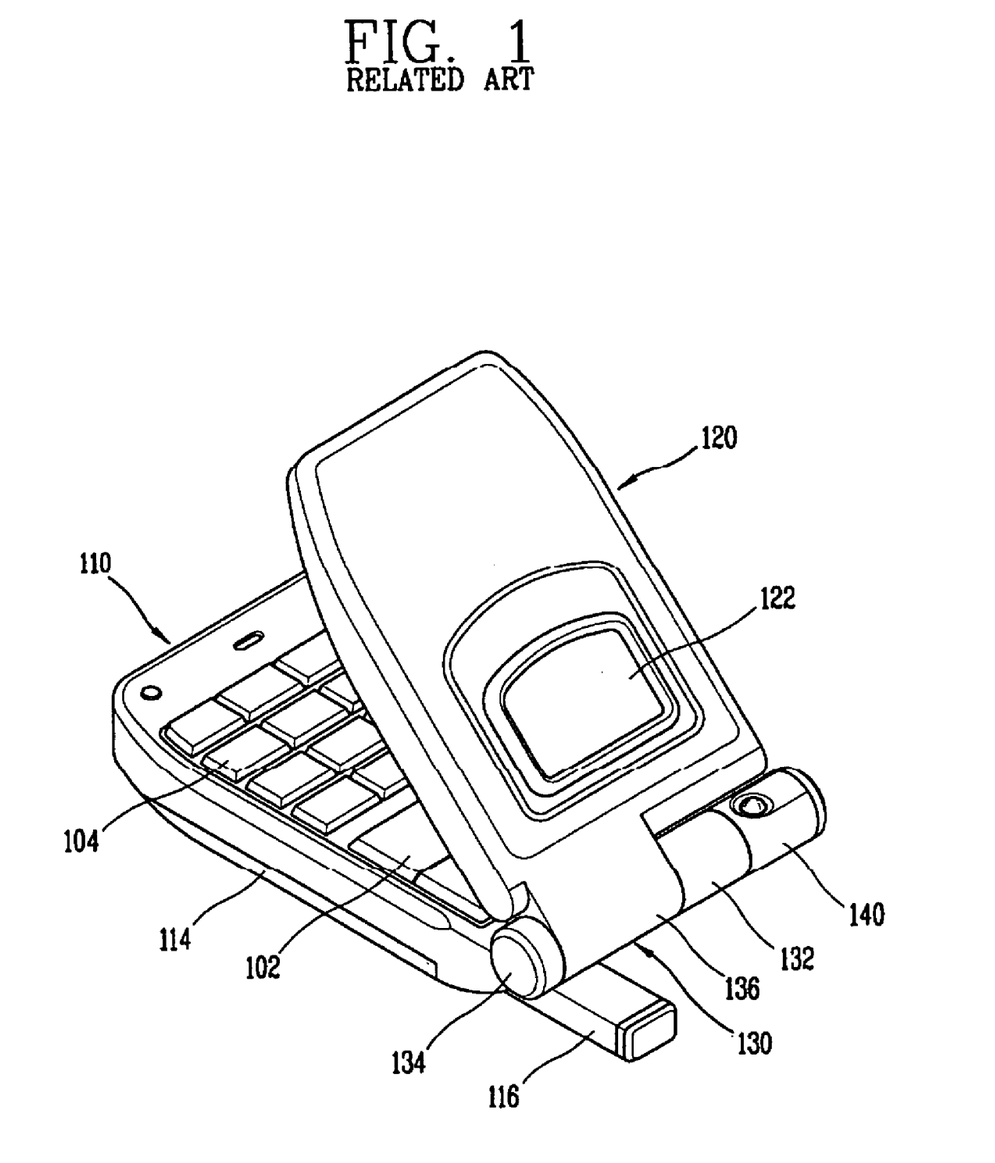
FIG. 1 is a perspective view of a folder type mobile terminal in accordance with the related art.

As shown in FIG. 1, a related art folder type mobile terminal includes a main body 110 having various circuit components therein and provided with menu buttons 102 and dial buttons 104. The folder type mobile terminal further includes a folder 120 rotatably connected to the main body 110 and having an LCD 122 for displaying terminal information. A camera 140 is rotatably mounted at a side of a hinge connection part 130 to allow a user take a photograph.

The main body 110 also includes a battery 114 detachably attached at a rear side thereof and an antenna 116 mounted at an upper side thereof for transmitting and receiving a radio wave. The hinge connection part 130 includes a first support part 132 formed at the center of an upper end of the main body 110, a second support part 134 formed at an end portion of the upper end of the main body 110 at a distance from the first support part 132, a hinge part 136 formed at a lower end of the folder 120 and rotatably disposed between the first support part 132 and the second support part 134, and a hinge module 138, as shown in FIG. 2, inserted in the second support part 134 and the hinge part 136 for rotatably supporting the hinge part 136.

Figure 2:
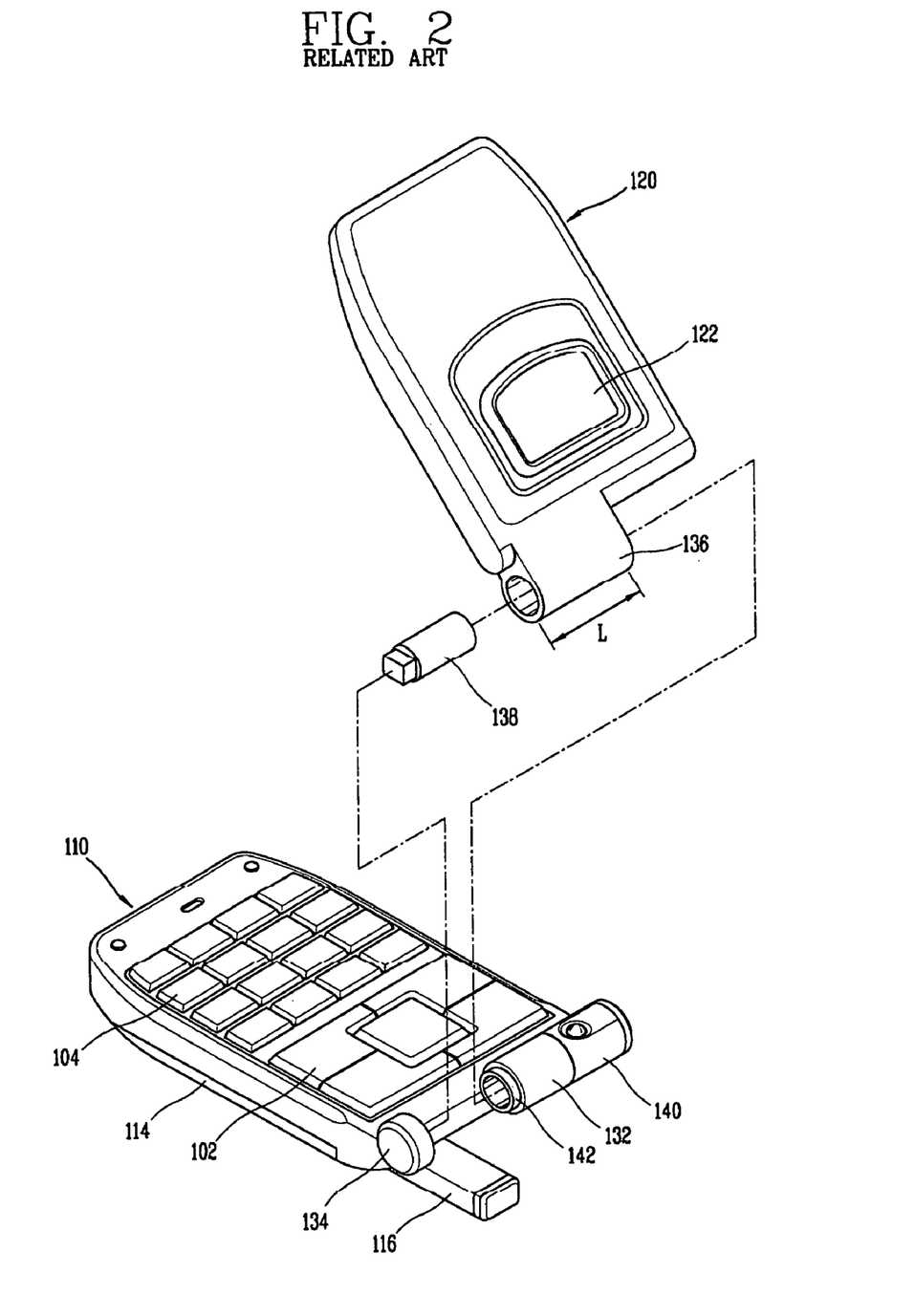
FIG. 2 is an exploded perspective view of a main body and a folder of a folder type mobile terminal in accordance with the related art.

Referring to FIG. 2, the first support part 132 has a cylindrical form. A hinge protrusion 142 is inserted at an end portion of the hinge part 136 and is rotatably supported therein, wherein the hinge protrusion 142 is protruded in a cylindrical form from a side of the first support part 132. The camera 140 is rotatably mounted at a side of the first support part 132 opposite the hinge protrusion 142.

The second support part 134 is formed at an end portion of an upper end of the main body 110 at a distance from the first support part 132. An end portion of the hinge module 138 is insertedly supported within the second support part 134.

The hinge part 136, having the cylindrical form, is positioned off-center from the lower end of the folder 120. The hinge module 138 is inserted and rotatably supported at a side of the hinge part 136 and the hinge protrusion 142 formed at the first hinge part 132 is inserted and rotatably supported at a side of the hinge part 136 opposite to wear the hinge module 138 is inserted.

As for the hinge connection part 130 of the related art folder type mobile terminal, the hinge protrusion 142 is inserted at and rotatably supports a side of the hinge part 136 formed at the folder 120. The hinge module 138 at the second support part 134 rotatably supports the other side of the hinge part 136, whereby the folder 120 can be relatively rotated over the main body 110.

Figure 3:
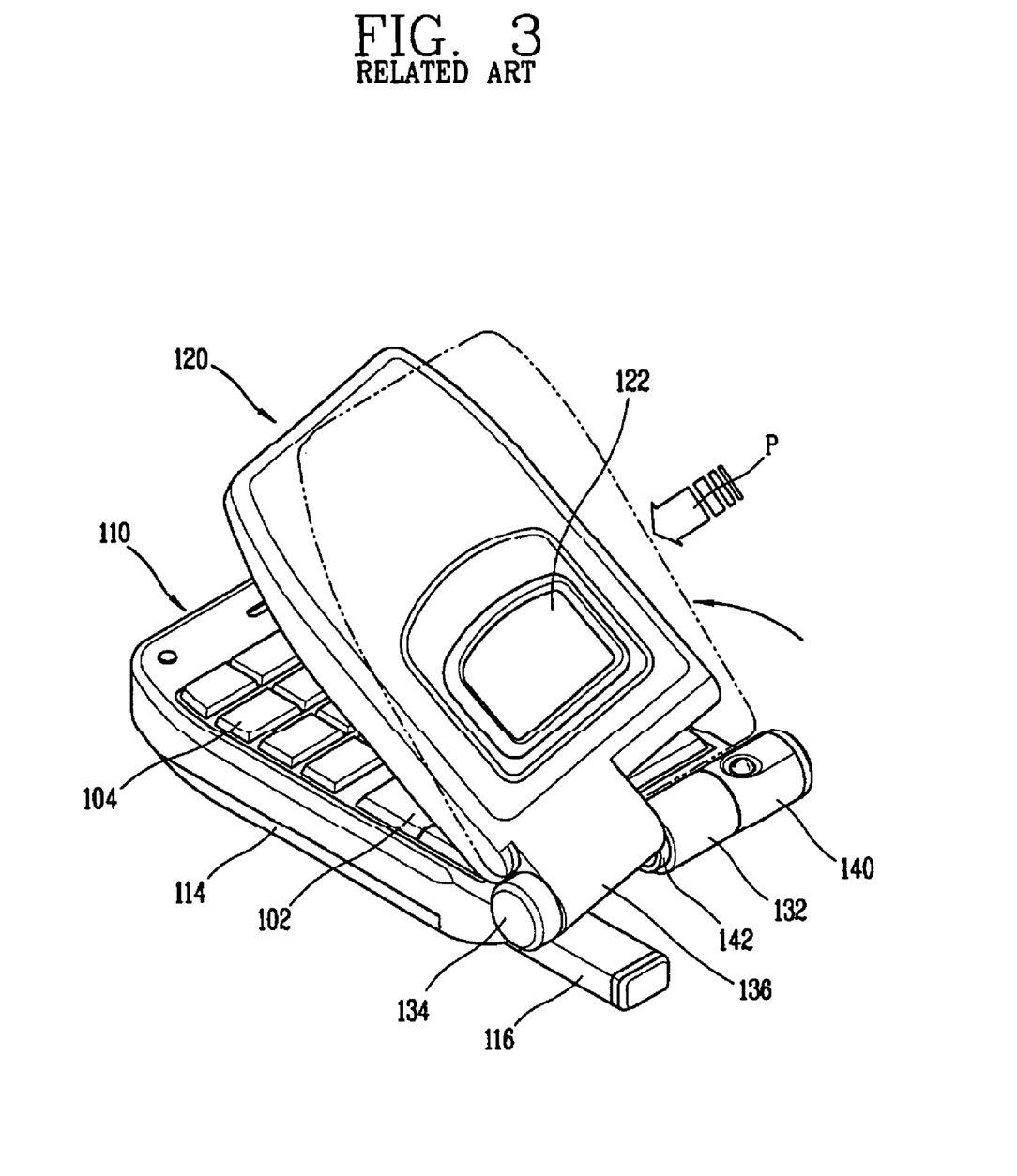
FIG. 3 is a perspective view of an external force being applied to a folder type mobile terminal in accordance with the related art.

However, the related art folder type mobile terminal has its problems. Because the camera 140 is mounted at the hinge connection part 130, the support area (L) of the hinge part 136 of the folder 120, as shown in FIG. 2, is reduced. This is due to the hinge part 136's cantilever form design such that the hinge part 136 is eccentrically supported off-center at the upper end of the main body 110. As shown in FIG. 3, if a user inadvertently drops the terminal so that an external force is applied to the terminal in the direction of an arrow 'P', the hinge part 136 is moved in a right direction (direction of the arrow 'P'). This movement is problematic because the hinge part 136 would then be released from the hinge protrusion 142 of the first support part 132. Hence, the folder 120 would be released from the main body 110. Additionally, if an external force is applied to the folder 120 in the left direction (direction opposite to the arrow 'P'), the folder 120 would be deformed, interfering with rotation of or damaging the camera 140.

SUMMARY OF THE INVENTION

The present invention relates to a folder type mobile terminal capable of preventing separation of a folder from a main body when an external force is applied to the terminal. The present invention does so by improving a hinge structure of a hinge connection part between the folder and the main body to prevent movement of the folder in a horizontal or left/right direction.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a folder type mobile terminal apparatus and method is provided. The apparatus, in one embodiment comprises a main body, a folder rotatably connected to the main body, a hinge connection part formed between the main body and the folder for rotatably connecting the folder to the main body, and a movement preventing part formed at the hinge connection part for preventing movement of the folder from the main body. Preferably, the movement preventing part prevents movement of the folder in a horizontal direction.

In one exemplary embodiment, the hinge connection part comprises a first support part formed at an upper end of the main body, a second support part formed at an end portion of the upper end of the main body at a distance from the first support part, and a hinge part formed at a lower end of the folder and rotatably disposed between the first support part and the second support part.

In another exemplary embodiment, a camera unit is rotatably mounted at the hinge connection part. Preferably, the camera unit is rotatably mounted at a side of the first support part and is inserted in the movement preventing part, wherein the movement preventing part rotatably supports the camera unit.

The movement preventing part is formed at a lower end of the folder at a distance from the hinge part, wherein the movement preventing part has a ring-like shape. The movement preventing part is also disposed between the camera unit and the first support part, wherein a hinge protrusion is formed at a side of the camera unit, the hinge protrusion being slidably inserted at an inner circumferential surface of the movement preventing part to rotatably support the movement preventing part. Preferably, a space part is formed between the first support part and the camera unit so that the movement preventing part can be inserted in the space part, wherein the space part has a larger width than a width of the movement preventing part so that the movement preventing part can be inserted into the space part.

In yet another exemplary embodiment, a plug is mounted in the space part to cover a remaining space of the space part after the movement preventing part is inserted into the space part, wherein the plug prevents movement of the movement preventing part in a horizontal direction. The plug comprises a plug opening and at least one hooking jaw formed on at least one unbounded end of the plug for engaging the main body. The plug further comprises a first hooking protrusion formed at a side of the plug, the first hooking protrusion being engaged with a second hooking protrusion formed at a side of the first support part.

In accordance with one aspect of the invention, a folder type mobile terminal has a main body and a folder rotatably connected to the main body, wherein a method for preventing movement of the folder in a horizontal direction, comprises inserting a hinge part formed at the folder into a first support part and a second support part formed at the main body, inserting a hinge protrusion of the first support part into a first side of the hinge part, hinge-connecting a second side of the hinge part by a second support part and a hinge module, inserting a movement preventing part formed at the folder into a space part formed at the main body, and inserting a plug into the space part to fill in a residual space not occupied by the movement preventing part. Preferably, the space part is located between the first support part and a camera unit.

The method further comprises inserting the camera unit into a side of the first support part, inserting a hinge protrusion of the camera unit into an inner surface of the movement preventing part, and mounting a stopper to a side of the main body so that the camera unit is rotatably supported at the first support part.

In accordance with another aspect of the invention, a clamshell mobile communication terminal comprises a first body for housing a keypad, a second body for housing a display, and a hinge rotatably connecting a first side of the first body and a first side of the second body together, the hinge having a first pin for engaging the first and second bodies, along a cylindrical joint comprising hollow first and second support members. An inner surface of the first body is approximately tangent to a front surface of the second body in a closed position. The inner surface of the first body can rotate away from the front surface of the second body about a first axis to expose the inner surface of the first body and the front surface of the second body in an open position. The first side of the first body and the first side of the second body are connected along said first axis by way of the first pin penetrating the first and second support members of the cylindrical joint along the first axis. The first and second support members are spaced apart. A digital camera unit is mounted along said first axis juxtaposed to the second support member. The terminal further comprises a spacer ring mounted in between the first and second support members for tightly securing the first and second support members along the first axis.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 4:
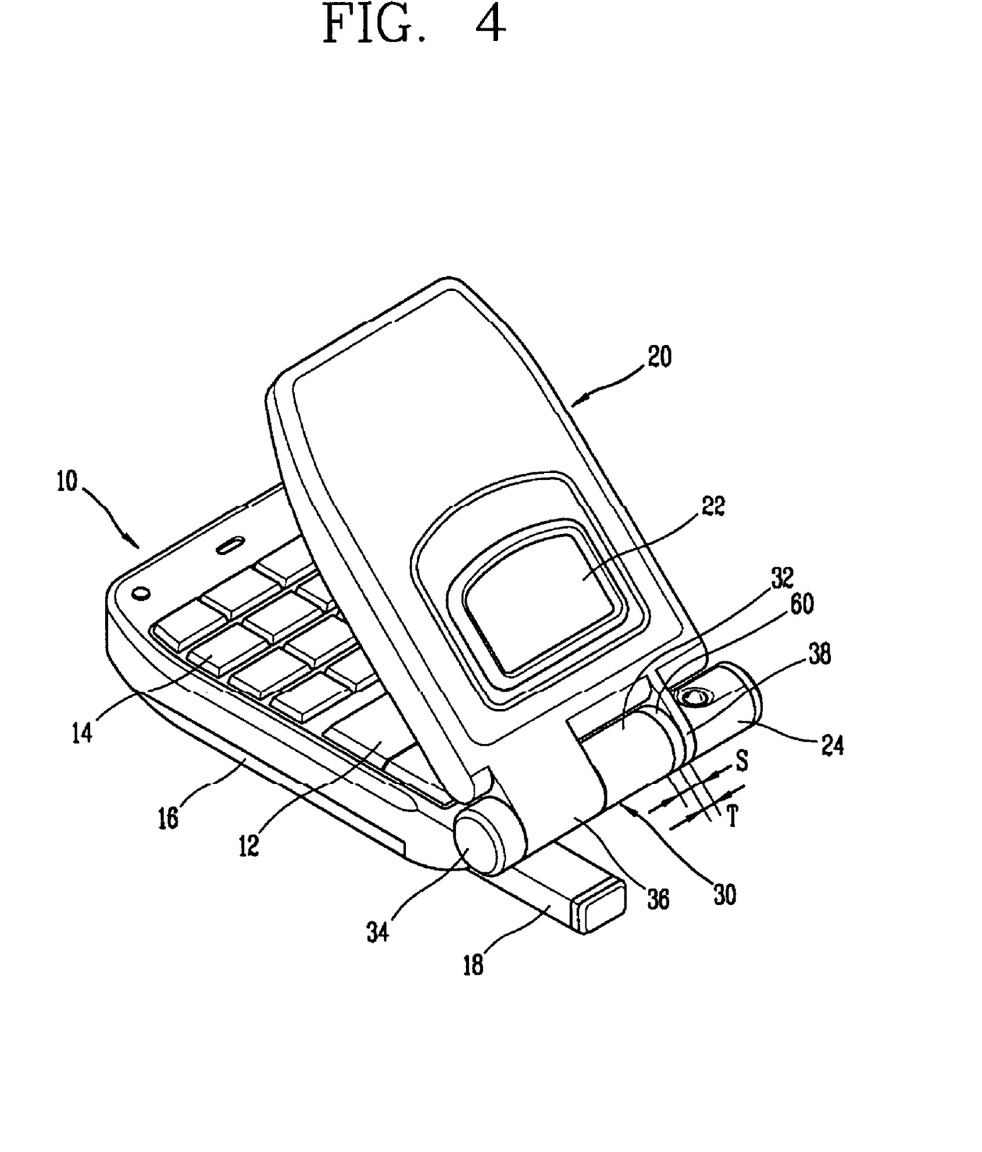
FIG. 4 is a perspective view of a folder type mobile terminal in accordance with one embodiment of the invention.

Referring to FIG. 4, a folder type mobile terminal comprises a main body 10 having a printed circuit board (PCB) with various circuit components mounted thereon. Menu buttons 12 and dial buttons 14 are also mounted on the main body 10. The terminal further comprises a folder 20 rotatably connected to the main body 10. The folder includes a display device 22, such as a liquid crystal display (LCD), for displaying user information. A hinge connection part 30 is formed between the main body 10 and the folder 20 for rotatably connecting the folder 20 with the main body 10. A camera unit 24 may be rotatably mounted at the hinge connection part 30 to allow the user to take a photograph with the terminal.

The main body 10 further comprises a battery 16 detachably attached at a rear surface of the main body to supply power to the terminal. An antenna 18 is mounted at an upper side of the main body to transmit and receive a communication signal.

Figure 6:
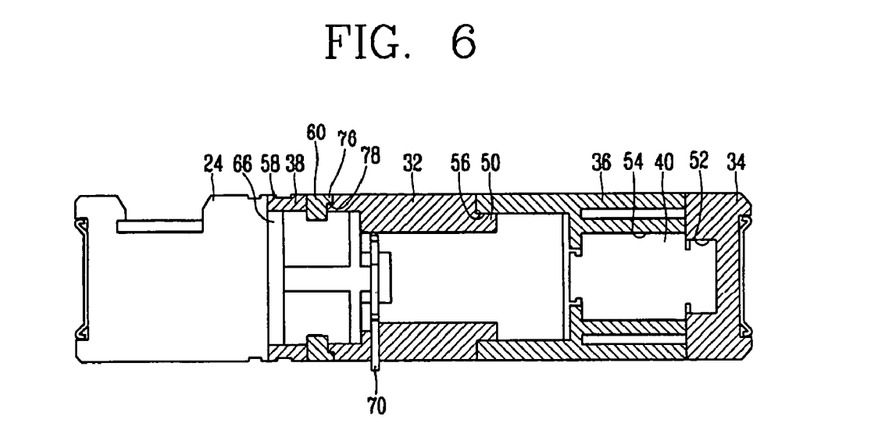
FIG. 6 is a sectional view of a hinge connection part of a folder type mobile terminal in accordance with one embodiment of the invention.

Preferably, the hinge connection part 30 comprises a first support part 32 formed at the center of an upper end of the main body 10. A second support part 34 is formed at an end portion of the upper end of the main body 10 at a certain distance from the first support part 32. A hinge part 36 is formed at a lower end of the folder 20 rotatably disposed between the first support part 32 and the second support part 34. As shown in FIG. 6, a hinge module 40 is inserted in the second support part 34 and the hinge part 36. A movement preventing part 38 is formed at a lower end of the folder 20 at a certain distance from the hinge part 36. The movement preventing part 38 serves to prevent movement of the folder 20, particularly to prevent movement in a horizontal or left/right direction.

The first support part 32 may have a cylindrical form and is formed at the center of the upper end of the main body 10. Referring again to FIG. 6, the camera unit 24 is rotatably supported at one side of the first support part 32. On the other side of the first support part 32, a cylindrical hinge protrusion 50 is formed. The hinge protrusion 50 preferably has a smaller diameter than the hinge part 36 so that it may be inserted into the hinge part 36. As shown in FIG. 6, the second support part 34 has a fixed groove 52 in which the hinge module 40 is insertedly fixed.

Figure 7:
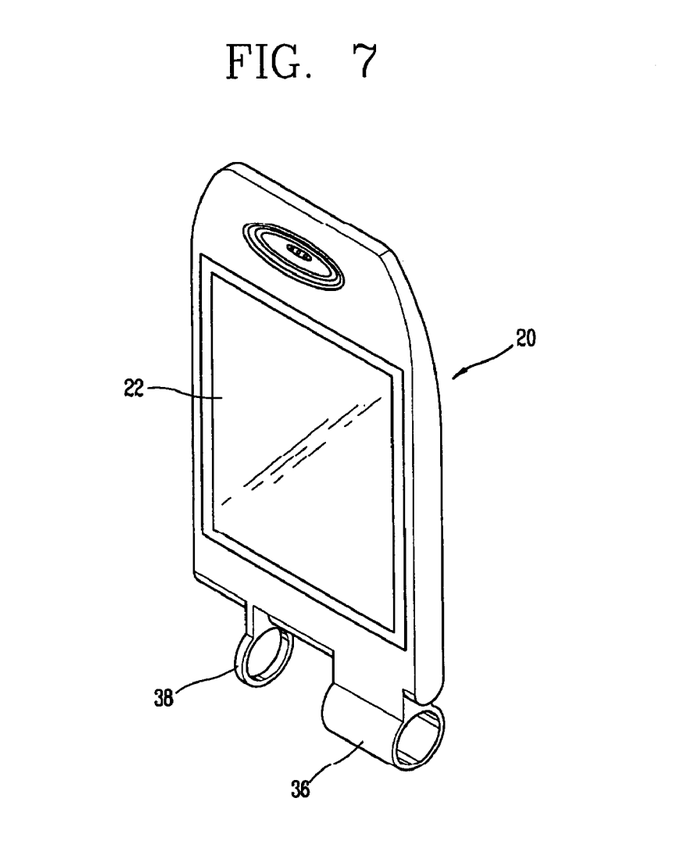
FIG. 7 is a perspective view of a folder in accordance with one embodiment of the invention.

Referring to FIGS. 6 and 7, the hinge part 36 may have a cylindrical form and is preferably disposed to one side of the lower end of the folder 20. A first hinge part 54, into which the hinge module 40 can be rotatably inserted, is formed at one side of the hinge part 36. A second hinge part 56 is formed at the other side of the hinge part 36 and is rotatably inserted at an outer circumferential surface of the hinge protrusion 50 of the first support part 32.

The movement preventing part 38 may have a cylindrical or ring-like shape and is preferably formed at a lower end of the folder 20 at a certain distance from the hinge part 36. Preferably, the camera unit 24 is inserted in the movement preventing part 38 wherein the camera unit is rotatably supported.

Figure 5:
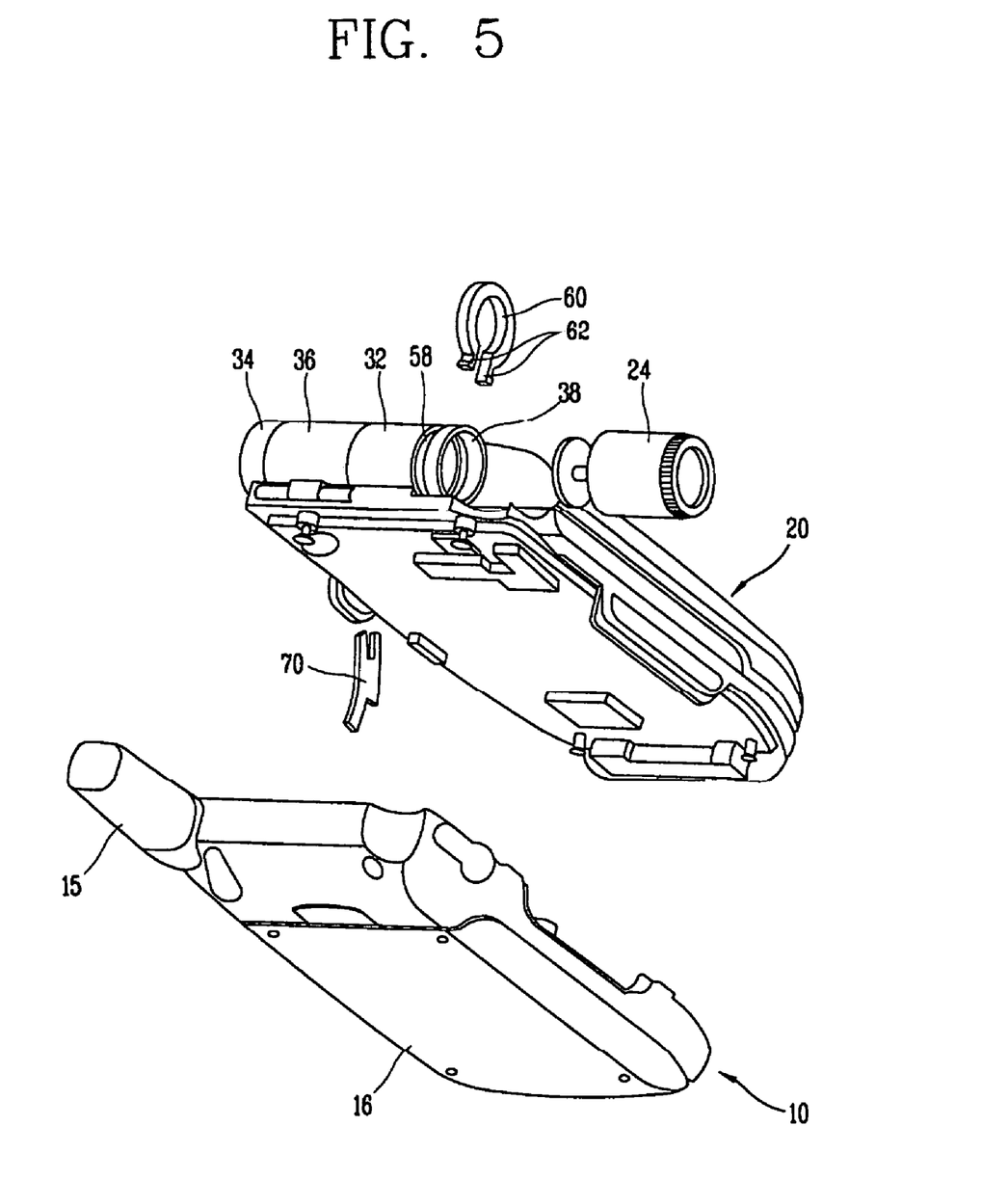
FIG. 5 is an exploded perspective view of a folder and a main body of a folder type mobile terminal in accordance with one embodiment of the invention.

As shown in FIGS. 5 and 6, a space part 58 is formed between the first support part 32 and the camera unit 24, into which the movement preventing part 38 is inserted. As shown in FIG. 4, a width (S) of the space part 58 is larger than a width (T) of the movement preventing part 38, thus allowing the movement preventing part to be placed within the space part.

Referring to FIGS. 4-6 and 8, a plug 60 is used for filling in a remaining space of the space part 58 after the movement preventing part 38 is inserted therein. The plug 60 serves to prevent movement of the movement preventing part 38 in a horizontal or left/right direction. The plug 60 may also be mounted in the space part 58 to give the outer surface of the mobile terminal a more aesthetically pleasing appearance.

As shown in FIG. 5, the plug 60 may have an unbounded ring-like shape. At an opening of the plug, unbounded ends of the plug 60 may comprise hooking jaws 62 for insertedly coupling the plug 60 to the upper end of the main body 10. As shown in FIG. 6, the plug 60 has a first hooking protrusion 76 formed at a side thereof. The first hooking protrusion 76 may be engaged to a second hooking protrusion 78 formed at a side of the first support part 32.

Further referring to FIG. 6, a hinge protrusion 66 is formed at a side of the camera unit 24. The hinge protrusion 66 is slidably inserted at an inner circumferential surface of the movement preventing part 38 to rotatably support the movement preventing part 38. After the camera unit 24 is inserted into the first support part 32, a stopper 70, as shown in FIGS. 5 and 6, is engaged so that the camera unit 24 can be rotatably supported at the first support part 32.

An assembling process and operation of the hinge connection part of the folder type mobile terminal in accordance with the present invention will now be described.

First, the hinge part 36 formed at the folder 20 is inserted into the first support part 32 and the second support part 34 formed at the main body 10. Then, the hinge protrusion 50 of the first support part 32 is inserted into one side of the hinge part 36. The other side of the hinge part 36 is hinge-connected by the second support part 34 and the hinge module 40.

After the hinge part 36 of the folder 20 is hinge connected to the first support part 32 and the second support part 34 of the main body 10, the movement preventing part 38 of the folder 20 is inserted into the space part 58 between the first support part 32 and the camera unit 24. At this time, the space part 58 has a sufficient (residual) space, so that the movement preventing part 38 can be easily inserted therein.

Thereafter, when the camera unit 24 is inserted to one side of the first support part 32, the hinge protrusion 66 of the camera 24 is inserted to the inner circumferential surface of the movement preventing part 38, so that the movement preventing part 38 can be rotatably supported.

Subsequently, the plug 60 is inserted into the space part 58 to fill in the residual space, and the stopper 70 is mounted at one side of the main body 10 so that the camera unit 24 can be rotatably supported at the first support part 32.

Figure 8:
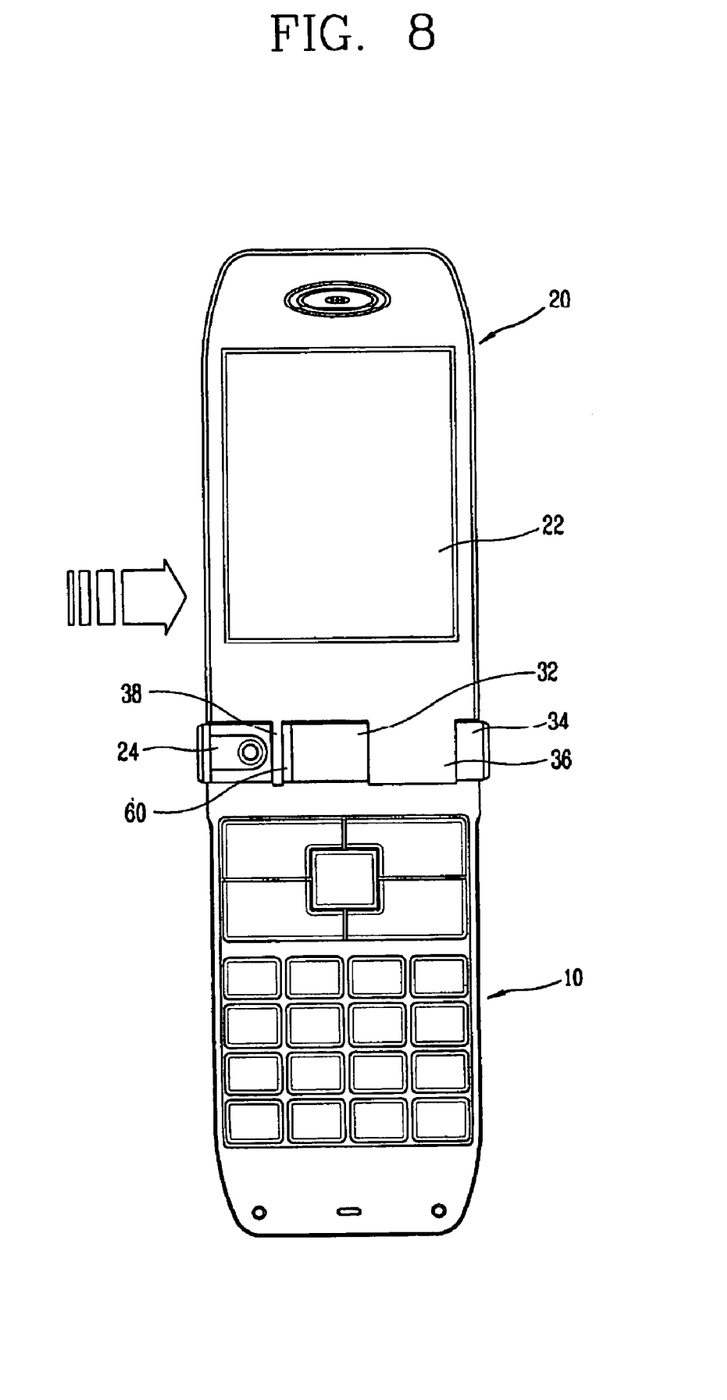
FIG. 8 is a front view of an external force being applied to a folder type mobile terminal in accordance with one embodiment of the invention.

As so far described, the folder type mobile terminal of the present invention has the following advantages. Because the movement preventing part 38 is formed at the folder 20 and rotatably supported between the first support part 32 of the main body 10 and the camera unit 24, even if a terminal is inadvertently dropped or an external force is applied in a side direction of the folder, as shown in FIG. 8, the hinge part 36 of the folder is prevented from moving in the horizontal or left/right direction, thereby preventing the folder from being released from the main body.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A folder type mobile terminal comprising:
   a main body;
   a folder rotatably connected to the main body, and having a display formed on an outer surface thereof for displaying information when the folder is closed;
   a hinge connection part formed between the main body and the folder for rotatably connecting the folder to the main body, the hinge connection part comprising a first support part formed at an upper end of the main body, a second support part formed at an end portion of the upper end of the main body at a distance from the first support part, and a hinge part formed at a lower end of the folder and rotatably disposed between the first support part and the second support part;
   a movement preventing part formed at a lower end of the folder at a distance from the hinge part for preventing movement of the folder from the main body;
   a camera unit rotatably mounted at the hinge connection part, wherein the first support part and the camera unit are separated by a space and the movement preventing part is inserted in the space, and
   a plug mounted to substantially fill a remaining gap of the space after the movement preventing part is inserted;
   wherein the plug prevents movement of the movement preventing part in a horizontal direction.

2. A folder type mobile terminal comprising:
   a main body;
   a folder rotatably connected to the main body;
   a hinge connection part formed between the main body and the folder for rotatably connecting the folder to the main body, the hinge connection part comprising a first support part formed at an upper end of the main body, a second support part formed at an end portion of the upper end of the main body at a distance from the first support part, and a hinge part formed at a lower end of the folder and rotatably disposed between the first support part and the second support part;
   a movement preventing part formed at a lower end of the folder at a distance from the hinge part for preventing movement of the folder from the main body;

a camera unit rotatably mounted at the hinge connection part, wherein the first support part and the camera unit are separated by a space and the movement preventing part is inserted in the space, wherein the camera unit is directly rotatable by a user independent of opening and closing motions of the folder, wherein the space, into which the movement preventing part is inserted, has a larger width than a width of the movement preventing part; and a plug mounted to substantially fill a remaining gap of the space after the movement preventing part is inserted;

wherein the plug prevents movement of the movement preventing part in a horizontal direction.

3. The terminal of claim 1, wherein the plug comprises:
a plug opening; and
at least one hooking jaw formed on at least one unbounded end of the plug for engaging the main body.

4. The terminal of claim 1, wherein the plug comprises a first hooking protrusion formed at a side of the plug, the first hooking protrusion being engaged with a second hooking protrusion formed at a side of the first support part.

5. The terminal of claim 2, wherein a hinge protrusion is formed at a side of the camera unit and the hinge protrusion is slidably inserted at an inner circumferential surface of the movement preventing part to rotatably support the movement preventing part, wherein after the camera unit is inserted into the first support part and a stopper, mounted at one side of the main body, is engaged so that the camera unit can be rotatably supported at the first support part.

6. A folder type mobile terminal comprising:
a main body;
a folder rotatably connected to the main body;
a hinge connection part formed between the main body and the folder for rotatably connecting the folder to the main body, the hinge connection part comprising a first support part formed at an upper end of the main body, a second support part formed at an end portion of the upper end of the main body at a distance from the first support part, and a hinge part formed at a lower end of the folder and rotatably disposed between the first support part and the second support part;

a movement preventing part formed at a lower end of the folder at a distance from the hinge part for preventing movement of the folder from the main body;

a camera unit rotatably mounted at the hinge connection part, wherein the first support part and the camera unit are separated by a space and the movement preventing part is inserted in the space, and a plug mounted to substantially fill a remaining gap of the space after the movement preventing part is inserted;

wherein the plug prevents movement of the movement preventing part in a horizontal direction.

7. The terminal of claim 1, wherein a stopper is mounted at one side of the main body such that the camera unit is rotatably supported at the first support part.

8. The terminal of claim 1, wherein the plug comprises:
a plug opening; and
at least one hooking jaw formed on at least one unbounded end of the plug for engaging the main body.

9. The terminal of claim 1, wherein the plug comprises a first hooking protrusion formed at a side of the plug, the first hooking protrusion being engaged with a second hooking protrusion formed at a side of the first support part.

10. The terminal of claim 2, wherein a stopper is mounted at one side of the main body such that the camera unit is rotatably supported at the first support part.

11. The terminal of claim 6, wherein the camera unit is directly rotatable by a user independent of opening and closing motions of the folder.

12. The terminal of claim 6, wherein a stopper is mounted at one side of the main body such that the camera unit is rotatably supported at the first support part.

13. The terminal of claim 6, wherein the plug comprises:
a plug opening; and
at least one hooking jaw formed on at least one unbounded end of the plug for engaging the main body.

14. The terminal of claim 6, wherein the plug comprises a first hooking protrusion formed at a side of the plug, the first hooking protrusion being engaged with a second hooking protrusion formed at a side of the first support part.

* * * * *